US011656988B2

(12) United States Patent
Hu et al.

(10) Patent No.: US 11,656,988 B2
(45) Date of Patent: May 23, 2023

(54) MEMORY DEVICE AND OPERATION METHOD THEREOF

(71) Applicant: MACRONIX INTERNATIONAL CO., LTD., Hsinchu (TW)

(72) Inventors: Han-Wen Hu, Tainan (TW); Yung-Chun Li, New Taipei (TW); Bo-Rong Lin, Taichung (TW); Huai-Mu Wang, New Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 23 days.

(21) Appl. No.: 17/542,557

(22) Filed: Dec. 6, 2021

(65) Prior Publication Data

US 2022/0334964 A1  Oct. 20, 2022

Related U.S. Application Data

(60) Provisional application No. 63/175,554, filed on Apr. 16, 2021.

(51) Int. Cl.
*G06F 12/00* (2006.01)
*G06F 12/0802* (2016.01)

(52) U.S. Cl.
CPC .. *G06F 12/0802* (2013.01); *G06F 2212/1024* (2013.01)

(58) Field of Classification Search
CPC ......... G06F 12/0802; G06F 2212/1024; G06F 7/02; G06F 7/06; G06F 7/38; G06F 7/52
See application file for complete search history.

(56) References Cited

U.S. PATENT DOCUMENTS

| | | | |
|---|---|---|---|
| 9,507,603 B2 | 11/2016 | Pechanek et al. | |
| 10,971,230 B2 | 4/2021 | Park | |
| 11,562,205 B2 * | 1/2023 | Wang | G06F 7/5443 |
| 2018/0197067 A1 * | 7/2018 | Mody | G06F 17/16 |

FOREIGN PATENT DOCUMENTS

| | | |
|---|---|---|
| TW | 202024898 A | 7/2020 |
| TW | I718566 B | 2/2021 |

\* cited by examiner

*Primary Examiner* — Shawn X Gu
(74) *Attorney, Agent, or Firm* — McClure, Qualey & Rodack, LLP

(57) ABSTRACT

A memory device and an operation method thereof are provided. The memory device includes: a plurality of page buffers, storing an input data; a plurality of memory planes coupled to the page buffers, based on received addresses of the memory planes, a plurality of weights stored in the memory planes, the memory planes performing bit multiplication on the weights and the input data in the page buffers in parallel to generate a plurality of bit multiplication results in parallel, the bit multiplication results stored back to the page buffers; and at least one accumulation circuit coupled to the page buffers, for performing bit accumulation on the bit multiplication results of the memory planes in parallel or in sequential to generate a multiply-accumulate (MAC) operation result.

18 Claims, 15 Drawing Sheets

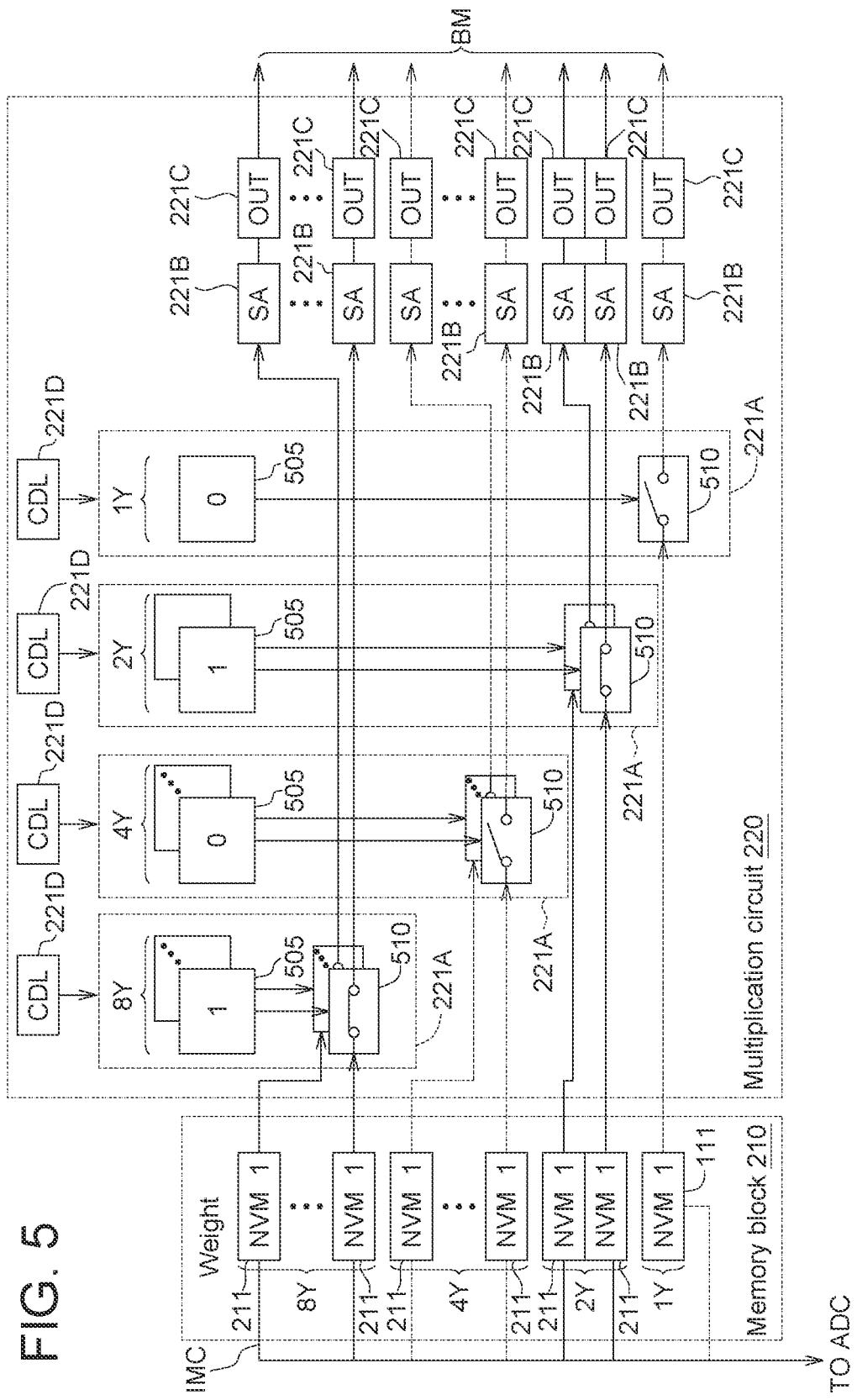

MEMORY DEVICE AND OPERATION METHOD THEREOF

This application claims the benefit of U.S. provisional application Ser. No. 63/175,554, filed Apr. 16, 2021, the subject matter of which is incorporated herein by reference.

TECHNICAL FIELD

The disclosure relates in general to an In-Memory-Computing memory device and an operation method thereof.

BACKGROUND

Artificial Intelligence ("AI") has recently emerged as a highly effective solution for many fields. The key issue in AI is that AI contains large amounts of input data (for example input feature maps) and weights to perform multiply-accumulate (MAC) operation.

However, the current AI structure usually encounters IO (input/output) bottleneck and inefficient MAC operation flow.

In order to achieve high accuracy, it would perform MAC operations having multi-bit inputs and multi-bit weights. But, the IO bottleneck becomes worse and the efficiency is lower.

In-Memory-Computing ("IMC") can accelerate MAC operations because IMC may reduce complicated arithmetic logic unit (ALU) in the process centric architecture and provide large parallelism MAC operation in memory.

In executing IMC, if the operation speed is improved, then the IMC performance will be improved.

SUMMARY

According to one embodiment, provided is a memory device including: a plurality of page buffers, storing an input data; a plurality of memory planes coupled to the page buffers, based on received addresses of the memory planes, a plurality of weights stored in the memory planes, the memory planes performing bit multiplication on the weights and the input data in the page buffers in parallel to generate a plurality of bit multiplication results in parallel, the bit multiplication results stored back to the page buffers; and at least one accumulation circuit coupled to the page buffers, for performing bit accumulation on the bit multiplication results of the memory planes in parallel or in sequential to generate a multiply-accumulate (MAC) operation result.

According to another embodiment, provided is an operation method for a memory device. The operation method includes: storing an input data in a plurality of page buffers; based on received addresses of a plurality of memory planes, performing, by the memory planes, bit multiplication in parallel on a plurality of weights stored in the plurality of memory planes and the input data to generate a plurality of bit multiplication results in parallel, the plurality of bit multiplication results being stored back to the page buffers; and performing bit accumulation on the plurality of bit multiplication results of the memory planes in parallel or in sequential to generate a multiply-accumulate (MAC) operation result.

BRIEF DESCRIPTION OF THE DRAWINGS

FIG. 5 shows an example of the multiplication operations of the first embodiment of the application.

Figure 1:
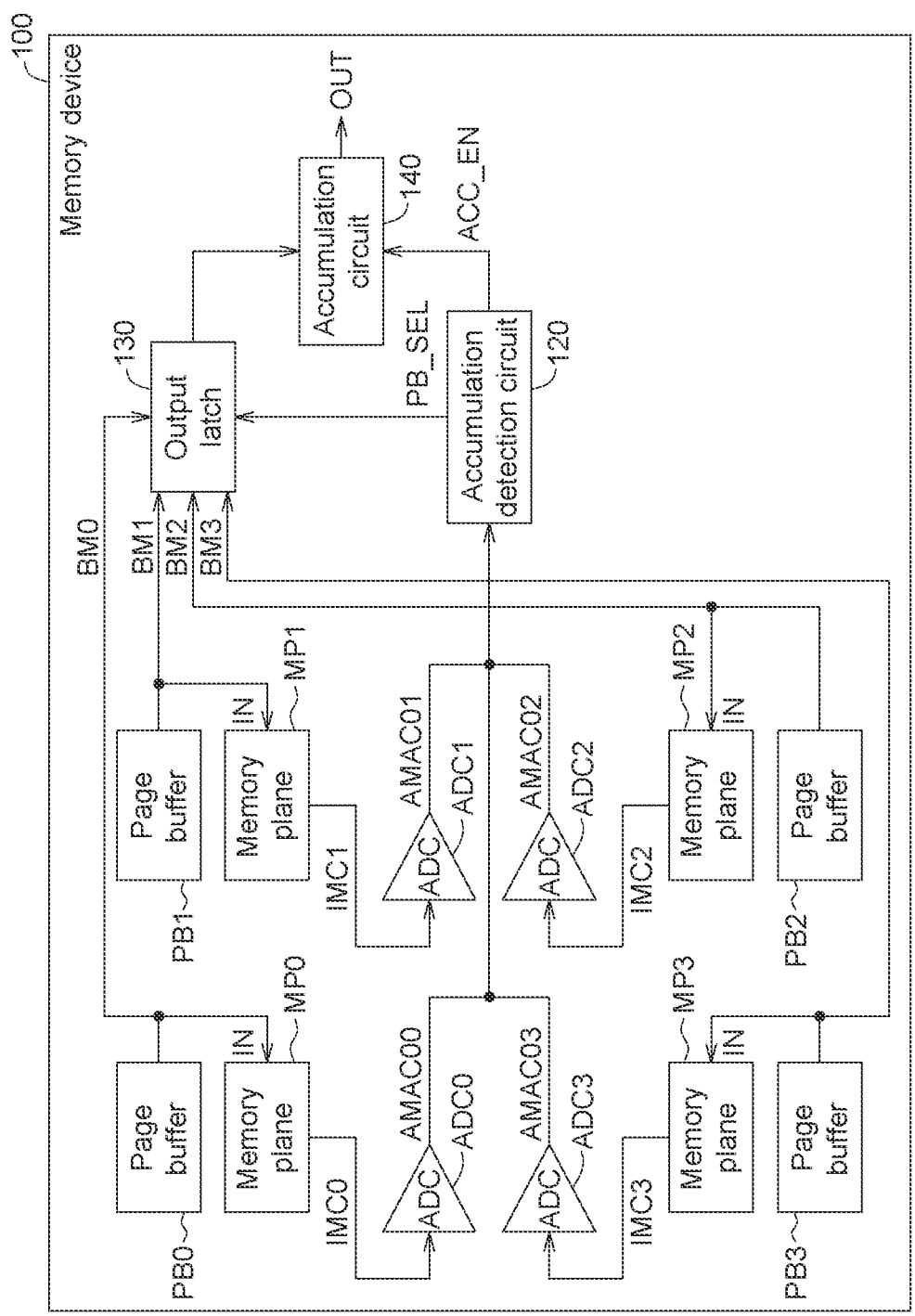
FIG. 1 shows a functional block diagram of an IMC (In-Memory-Computing) memory device according to a first embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

First Embodiment

FIG. 1 shows a functional block diagram of an IMC (In-Memory-Computing) memory device 100 according to a first embodiment of the application. The memory device 100 includes a plurality of memory planes, a plurality of page buffers, a plurality of conversion units, an accumulation detection circuit 120, an output latch 130 and an accumulation circuit 140. The conversion unit is for example but not limited by, an analog-to-digital converter (ADC).

For simplicity, in FIG. 1, the memory device 100 includes four memory planes MP0-MP3, four page buffers PB0-PB3, four conversion units ADC0-ADC3, an accumulation detection circuit 120, an output latch 130 and an accumulation circuit 140. But the application is not limited thereby.

The page buffers PB0-PB3 may store an input data IN and send the input data IN to the memory planes MP0-MP3. A plurality of bit multiplication results BM0-BM3 generated by the memory planes MP0-MP3 are stored back to the page buffers PB0-PB3. Further, controlled by a page buffer selection signal PB_SEL, the output latch 130 selects the bit multiplication results BM0-BM3 stored in the corresponding page buffers PB0-PB3 to the accumulation circuit 140.

The memory planes MP0-MP3 are coupled to the page buffers PB0-PB3. The memory planes MP0-MP3 parallel perform bit multiplication operations (for example, bit AND operations) on weights stored in the memory planes MP0-MP3 with the input data IN from the page buffers PB0-PB3 to parallel generate the bit multiplication results BM0-BM3. The bit multiplication results BM0-BM3 are stored back into the page buffers PB0-PB3. Further, one or more memory cell string(s) of the memory planes MP0-MP3 are selected to enable the sensing operations. When the weights stored in the memory planes MP0-MP3 and the input data IN from the page buffers PB0-PB3 are bit-multiplied, a plurality of memory cells of the memory planes MP0-MP3 generate a plurality of memory cell currents IMC0-IMC3 and the memory cell currents IMC0-IMC3 are commonly input into the conversion units ADC0-ADC3.

The conversion units ADC0-ADC3 are coupled to the memory planes MP0-MP3. The memory cell currents IMC0-IMC3 of the memory planes MP0-MP3 are input into the conversion units ADC0-ADC3, respectively. The conversion units ADC0-ADC3 convert the memory cell currents IMC0-IMC3 of the memory planes MP0-MP3 into a plurality of conversion results AMACO0-AMACO3.

The accumulation detection circuit 120 is coupled to the conversion units ADC0-ADC3. The accumulation detection circuit 120 compares the conversion results AMACO0-AMACO3 of the conversion units ADC0-ADC3 with a threshold value respectively to generate a page buffer selection signal PB_SEL to the output latch 130 and to generate an accumulation enable signal ACC_EN to the accumulation circuit 140. When the conversion results AMACO0-AMACO3 are higher than the threshold value, in response to the page buffer selection signal PB_SEL, the output latch 130 selects the corresponding bit multiplication results BM0-BM3 stored in the corresponding page buffers PB0-PB3 to the accumulation circuit 140.

When at least one among the conversion results AMACO0-AMACO3 is higher than the threshold value, the accumulation enable signal ACC_EN is in the enabled state; and on the contrary, the accumulation enable signal ACC_EN is in the disabled state.

The output latch 130 is coupled to the accumulation detection circuit 120 and the page buffers PB0-PB3. In response to the page buffer selection signal PB_SEL, the output latch 130 selects the corresponding bit multiplication results BM0-BM3 stored in the corresponding page buffers PB0-PB3 to the accumulation circuit 140. For example but not limited by, when the conversion results AMACO0 and AMACO1 from the conversion units ADC0 and ADC1 are higher than the threshold value, in response to the page buffer selection signal PB_SEL, the output latch 130 selects the corresponding bit multiplication results BM0-BM1 stored in the corresponding page buffers PB0-PB1 to the accumulation circuit 140.

The accumulation circuit 140 is coupled to the output latch 130 and the accumulation detection circuit 120. When enabled by the accumulation enable signal ACC_EN, the accumulation circuit 140 performs bit accumulation operations on the bit multiplication results BM0-BM3 from the output latch 130 to generate a MAC operation result OUT, and the details are described later.

Figure 2:
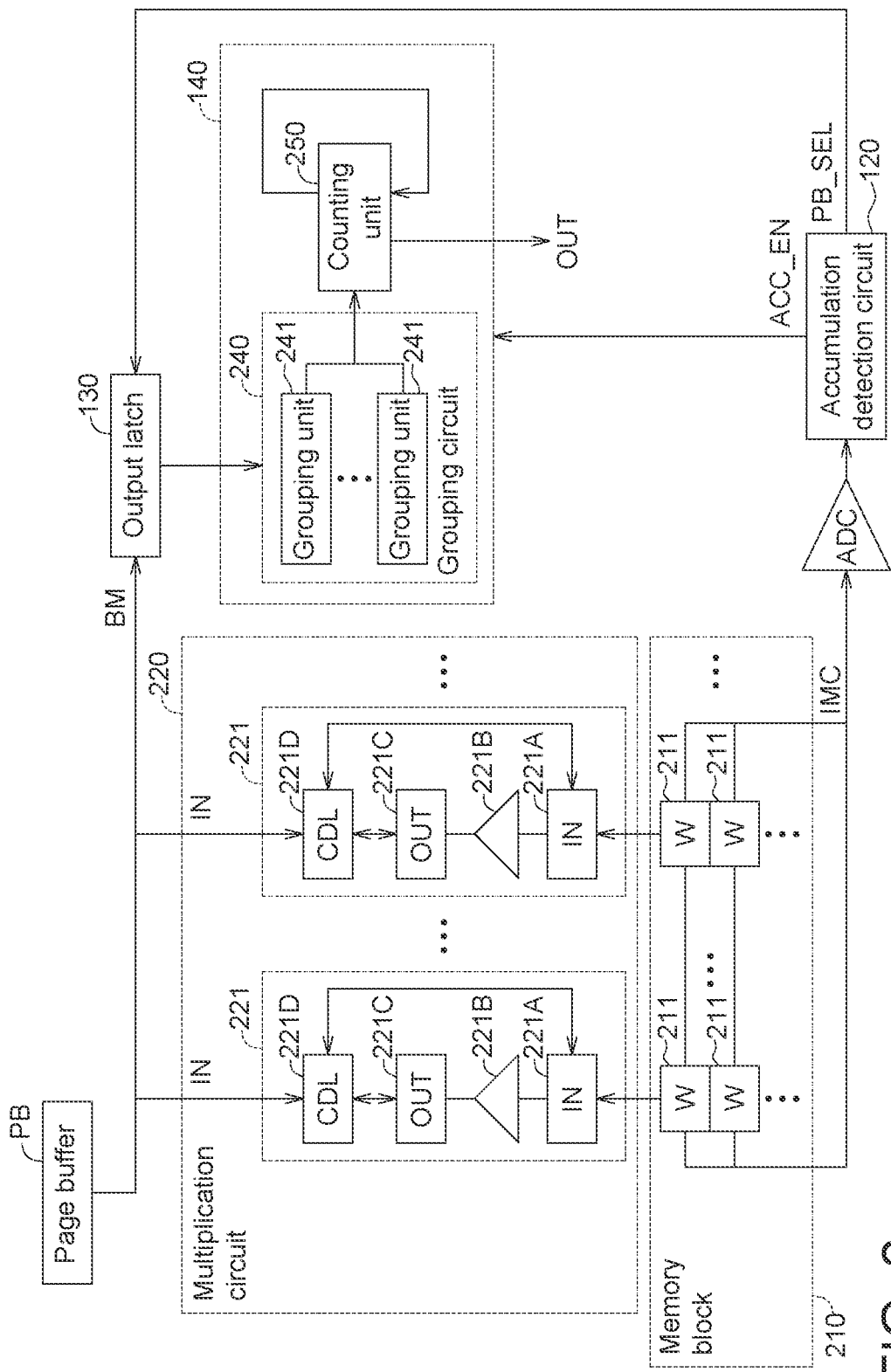
FIG. 2 shows a functional block diagram of a memory plane and an accumulation circuit according to the first embodiment of the application.

FIG. 2 shows a functional block diagram of a memory plane and an accumulation circuit according to the first embodiment of the application. The memory plane MP in FIG. 2 may be used to implement the memory planes MP0-MP3 in FIG. 1. As shown in FIG. 2, the memory plane MP includes a memory block 210 and a multiplication circuit 220. The accumulation circuit 140 includes a grouping circuit 240 and a counting unit 250. The multiplication circuit 220 is analog while the accumulation circuit 140, the grouping circuit 240 and the counting unit 250 are digital.

The memory block 210 includes a plurality of memory cells 211. In one embodiment of the application, the memory cell 211 is for example but not limited by, a non-volatile memory cell. In MAC operations, the memory cells 211 are used for storing the weights.

The multiplication circuit 220 is coupled to the memory block 210. The multiplication circuit 20 includes a plurality of single-bit multiplication units 221. Each of the single-bit multiplication units 221 includes an input latch 221A, a sensing amplifier (SA) 221B, an output latch 221C and a common data latch (CDL) 221D. The input latch 221A is coupled to the memory block 210. The sensing amplifier 221B is coupled to the input latch 221A. The output latch 221C is coupled to the sensing amplifier 221B. The common data latch 221D is coupled to the output latch 221C. The bit multiplication result BM from the multiplication circuit 220 is stored back to the page buffer PB.

When the weight stored in the memory cell 211 is logic 1 and the corresponding input data IN is also logic 1, the memory cell 211 generates the cell current. The cell currents from the memory cells 211 are summed into a memory cell current IMC.

In the first embodiment of the application, "digital accumulation" refers to that the accumulation circuit 140 is enabled but the conversion units ADC0-ADC3 are not enabled. "Hybrid accumulation" refers to that the accumulation circuit 140 and the conversion units ADC0-ADC3 are enabled. That is, in the first embodiment of the application, the conversion units ADC0-ADC3 are optionally triggered.

In one embodiment of the application, trigger of the conversion units may be used to rapidly filter the useless data to improve the MAC operation speed; the accumulating circuit 140 may accumulate the unfiltered data to improve the MAC operation accuracy. The hybrid accumulating may eliminate the variation influence of using low-resolution quantization, avoid the accumulation of useless data and maintain the resolution.

The grouping circuit 240 is coupled to the output latch 130, The grouping circuit 240 includes a plurality of grouping units 241. The grouping units 241 perform grouping operations on the bit multiplication results BM0-BM3 to generate a plurality of grouping results. In one possible embodiment of the application, the grouping technique may be implemented by the majority technique, for example, the majority function technique, the grouping circuit 240 may be implemented by a majority grouping circuit based on the majority function technique, and the grouping units 241 may be implemented by a distributed majority grouping unit, which is not intended to limit the application. The grouping technique may be implemented by other similar techniques.

The counting unit 250 is coupled to the grouping circuit 240. In one embodiment of the application, the counting unit 250 is for performing bitwise counting or bitwise accumulating on the grouping results (i.e. the majority results) from the grouping circuit 240 to generate the MAC operation result OUT. In one embodiment of the application, the counting unit 250 is implemented by known counting circuits, for example but not limited by, a ripple counter. In the application, the term "counting" and "accumulating" are interchangeable, and the counter and the accumulator have substantially the same meaning.

In the first embodiment of the application, by the circuit structure in FIG. 1 and FIG. 2, the current from each memory plane may be individually quantized. Further, the accumulation circuit 140 may be shared by the memory planes, which may further reduce the circuit area.

Figure 3:
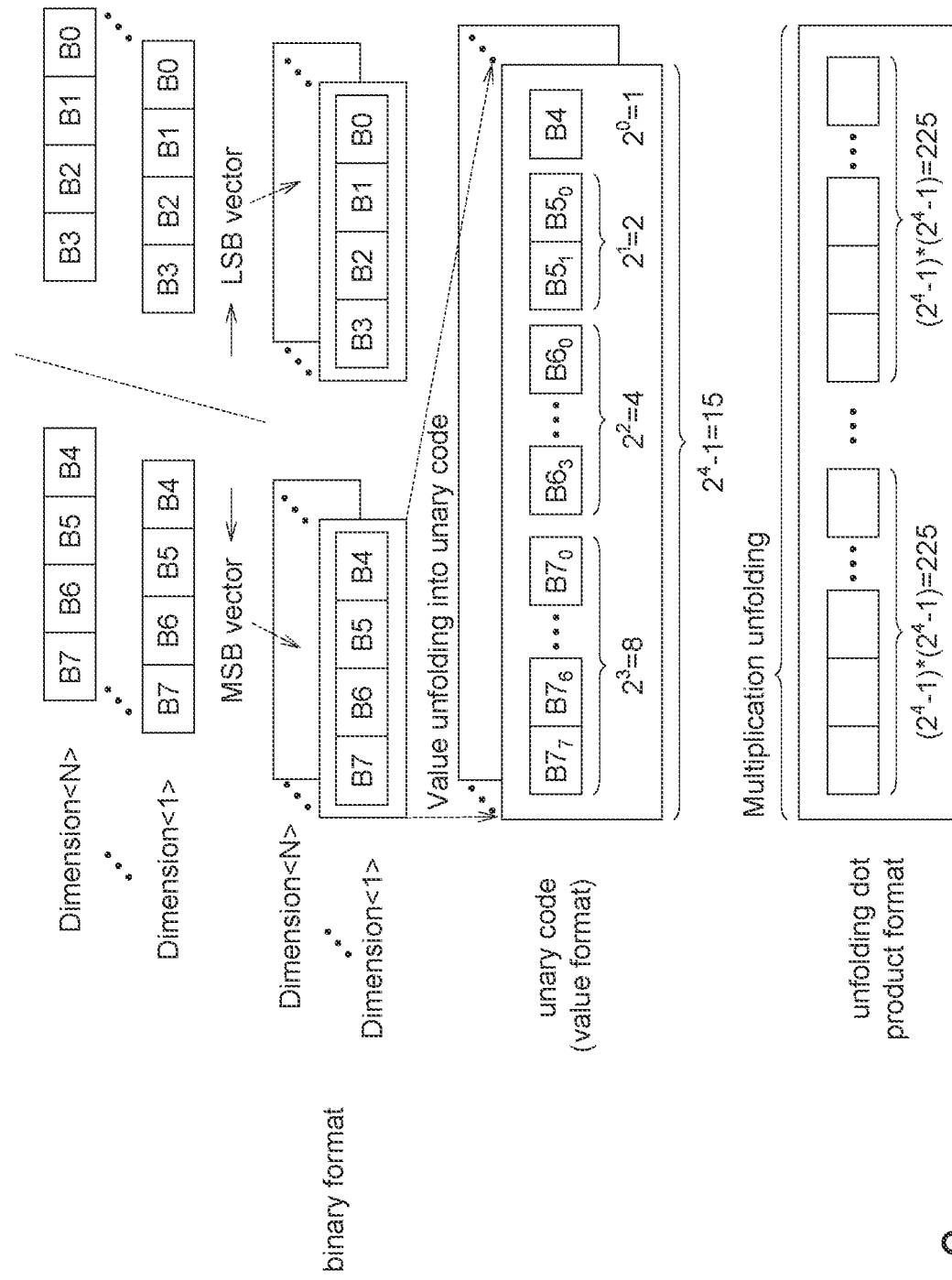
FIG. 3 shows data mapping according to the first embodiment of the application.

Now refer to FIG. 3 which shows data mapping according to one embodiment of the application. As shown in FIG. 3, each input data and each weight have N dimension(s) (N being a positive integer) with 8 bit precision, but the application is not limited by this.

Data mapping of the input data is described as an example but the application is not limited by. The following description is also suitable for data mapping of the weights.

When the input data (or the weight) is represented by a binary 8-bit format, the input data (or the weight) includes a most significant bit (MSB) vector and a least significant bit (LSB) vector. The MSB vector of the 8-bit input data (or the weight) includes bits B7 to B4 and the LSB vector of the 8-bit input data (or the weight) includes bits B3 to B0.

Each bit of the MSB vector and the LSB vector of the input data is represented into unary code (value format). For example, the bit B7 of the MSB vector of the input data may be represented as $B7_0$-$B7_7$, the bit B6 of the MSB vector of the input data may be represented as $B6_0$-$B6_3$, the bit B5 of the MSB vector of the input data may be represented as $B5_0$-$B5_1$, and the bit B4 of the MSB vector of the input data may be represented as 34.

Then, each bit of the MSB vector of the input data and each bit of the LSB vector of the input data represented into unary code (value format) are respectively duplicated multiple times into an unfolding dot product (unFDP) format. For example, each of the MSB vector of the input data are duplicated by $(2^4-1)$ times, and similarly, each of the LSB vector of the input data are duplicated by $(2^4-1)$ times. By so, the input data are represented in the unFDP format. Similarly, the weights are also represented in the unFDP format.

Multiplication operation is performed on the input data (in the unFDP format) and the weights (in the unFDP format) to generate a plurality of multiplication results.

For understanding, one example of data mapping is described but the application is not limited thereby.

Figure 4A:
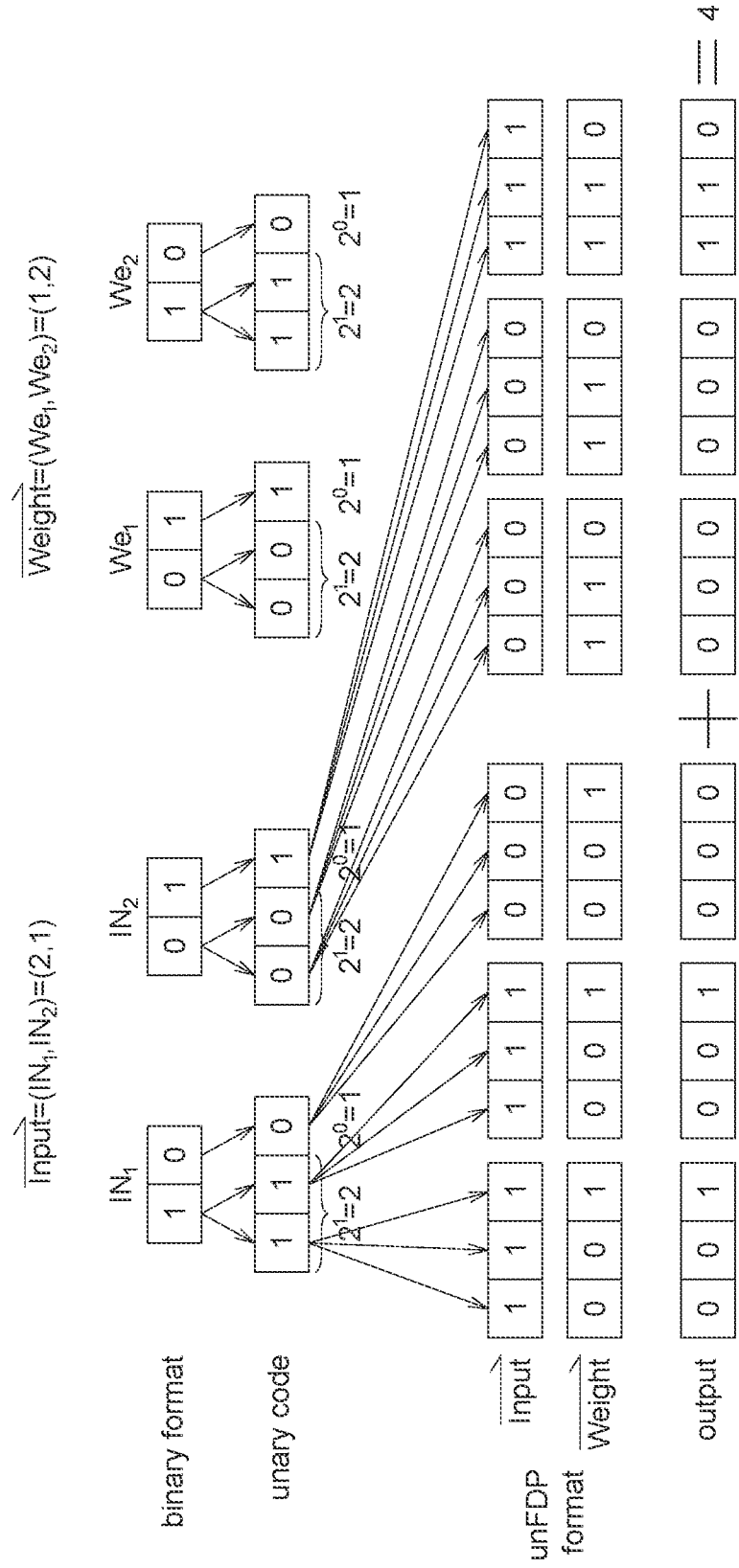
FIG. 4A to FIG. 4C show several possible example of data mapping according to the first embodiment of the application.

Now refer to FIG. 4A which shows one possible example of data mapping in one dimension according to the first embodiment of the application. As shown in FIG. 4A, the input data is $(IN_1, IN_2)=(2, 1)$ and the weight is $(We_1, We_2)=(1, 2)$. The MSB and the LSB of the input data is represented in the binary format, and thus $IN_1=10$ while $IN_2=01$. Similarly, the MSB and the LSB of the weight is represented in the binary format, and thus $We_1=01$ while $We_2=10$.

Then, the MSB and the LSB of the input data, and the MSB and the LSB of the weight are encoded into unary code (value format). For example, the MSB of the input data is encoded into "110", while the LSB of the input data is encoded into "001". Similarly, the MSB of the weight is encoded into "001", while the LSB of the weight is encoded into "110".

Then, each bit of the MSB (110, encoded into the unary code) of the input data and each bit of the LSB (001, encoded into the unary code) of the input data are duplicated a plurality of times to be represented in the unFDP format. For example, each bit of the MSB (110, represented in the value format) of the input data is duplicated three times, and thus the unFDP format of the MSB of the input data is 111111000. Similarly, each bit of the LSB (001, represented in the value format) of the input data is duplicated three times, and thus the unFDP format of the LSB of the input data is 000000111.

The multiplication operation is performed on the input data (represented in the unFDP format) and the weights to generate an MAC operation result. The MAC operation result is 1*0=0, 1*0=0, 1*1=1, 1*0=0, 1*0=0, 1*1=1, 0*0=0, 0*0=0, 0*1=0, 0*1=0, 0*1=0, 0*0=0, 0*1=0, 0*1=0, 0*0=0, 1*1=1, 1*1=1, 1*0=0. The values are summed into: 0+0+1+0+0+1+0+0+0+0+0+0+0+0+0+1+1+0=4.

From the above description, when the input data is "i" bits while the weight is "j" bits (both "i" and "j" are positive integers), the total memory cell number used in the MAC (or the multiplication) operations will be $(2^i-1)*(2^j-1)$.

Figure 4B:
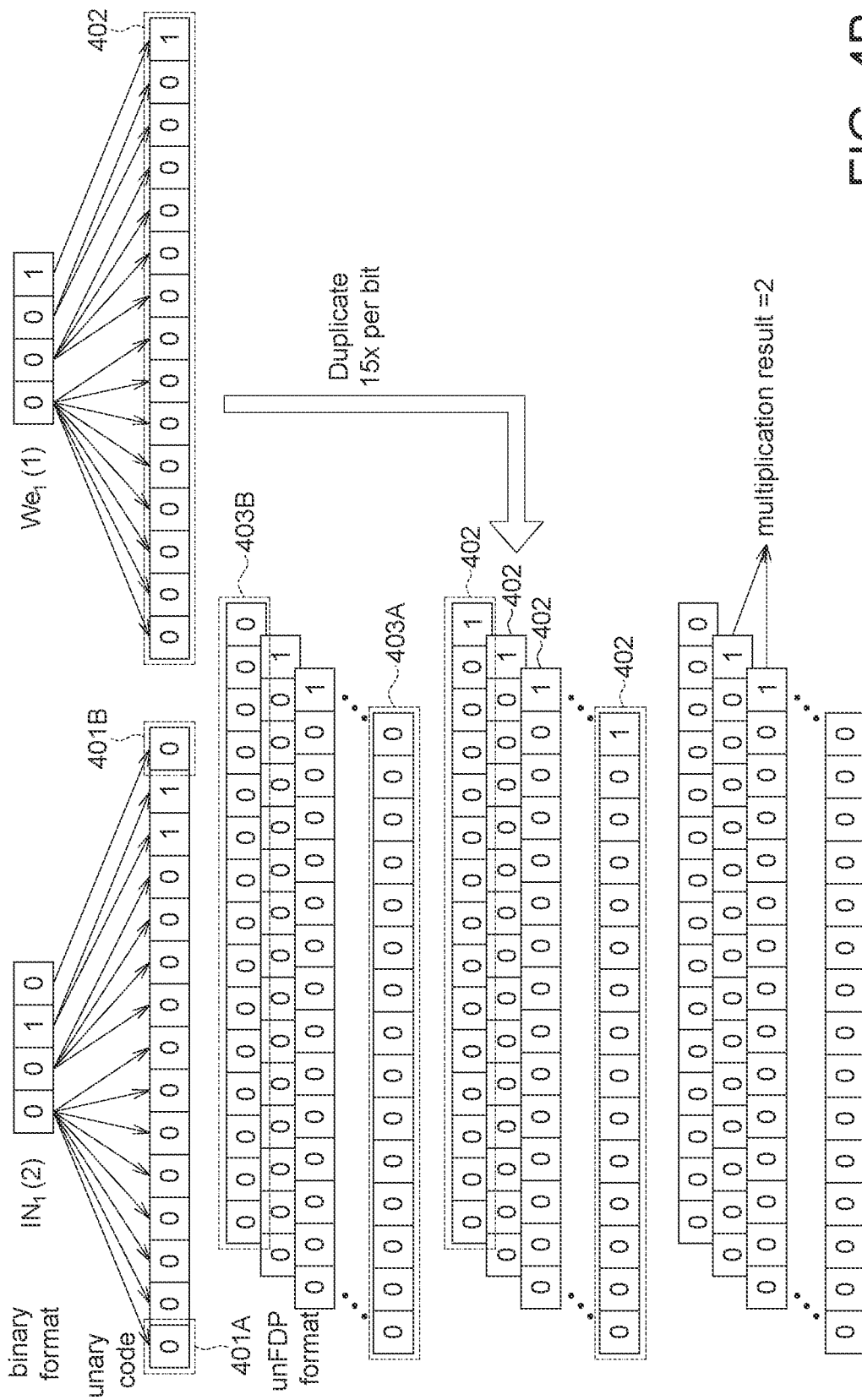

Now refer to FIG. 4B which shows another possible example of data mapping according to the first embodiment of the application. As shown in FIG. 4B, the input data is $(IN_1)=(2)$ and the weight is $(We_1)=(1)$. The input data and the weight are in 4-bit.

The input data is represented in the binary format, and thus $IN_1=0010$. Similarly, the weight is represented in the binary format, and thus $We_1=0001$.

The input data and the weight are encoded into unary code (value format). For example, the highest bit "0" of the input data is encoded into "00000000", while the lowest bit "0" of the input data is encoded into "0" and so on. Similarly, the highest bit "0" of the weight is encoded into "00000000", while the lowest bit "1" of the weight is encoded into "1".

Then, each bit of the input data (encoded into the unary code) is duplicated a plurality of times to be represented in the unFDP format. For example, the highest bit 401A of the input data (encoded into the unary code) is duplicated fifteen times into the bits 403A; and the lowest bit 401B of the input data (encoded into the unary code) is duplicated fifteen times into the bits 403B.

The weight 402 (encoded into the unary code) is duplicated fifteen times to be represented in the unFDP format.

The multiplication operation is performed on the input data (represented in the unFDP format) and the weights (represented in the unFDP format) to generate an MAC operation result. In details, the bits 403A of the input data are multiplied by the weight 402; the bits 403E of the input data are multiplied by the weight 402; and so on. The MAC operation result ("2") is generated by adding the multiplication values.

Figure 4C:
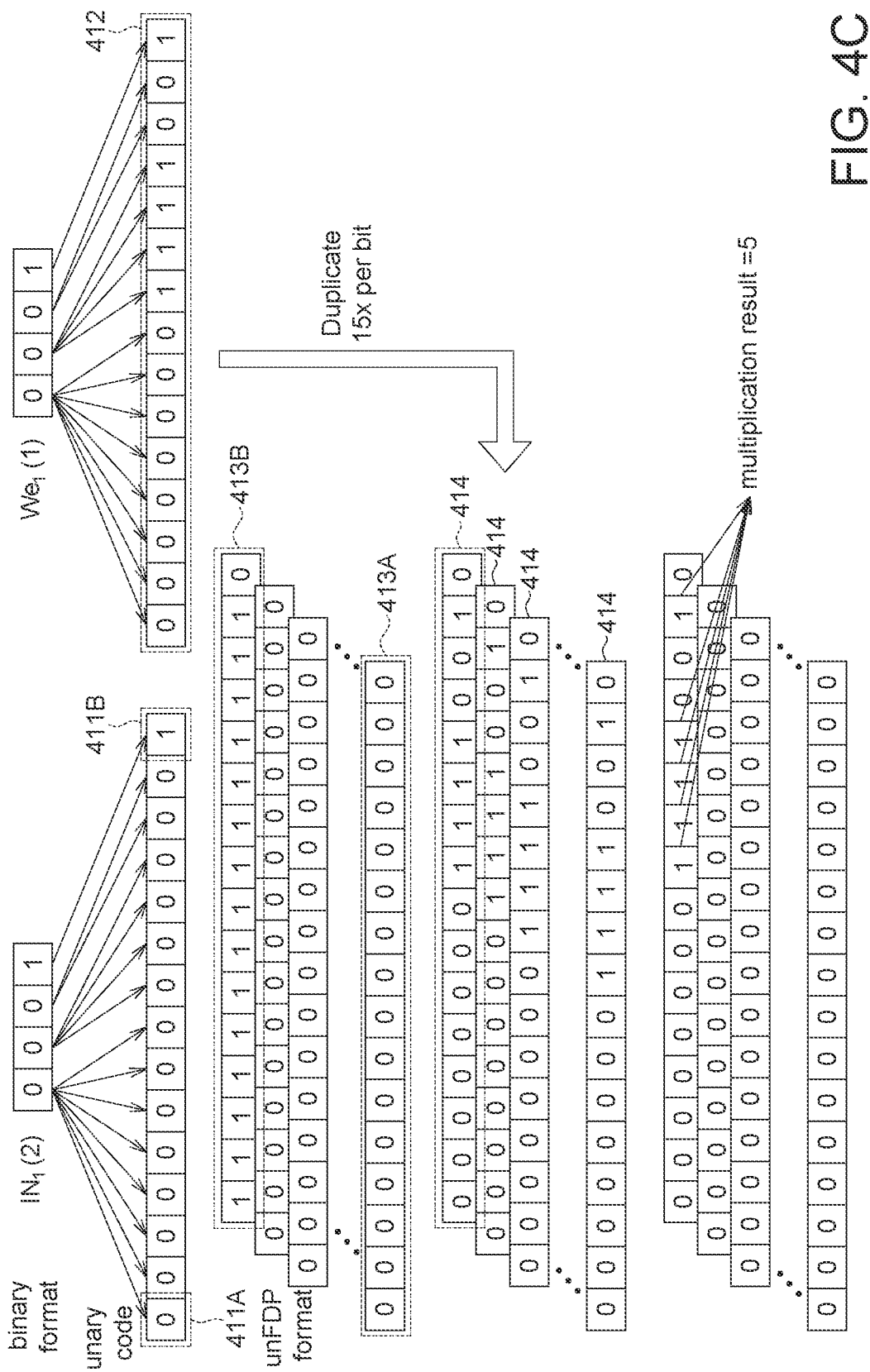

Now refer to FIG. 4C which shows another possible example of data mapping according to the first embodiment of the application. As shown in FIG. 4C, the input data is $(IN_1)=(1)$ and the weight is $(We_1)=(5)$. The input data and the weight are in 4-bit.

The input data is represented in the binary format, and thus $IN_1=0001$. Similarly, the weight is represented in the binary format, and thus $We_1=0101$.

Then, the input data and the weight are encoded into unary code (value format).

Then, each bit of the input data (encoded into the unary code) is duplicated a plurality of times to be represented in the unFDP format. In FIG. 4C, a bit "0" is added when each bit of the input data and each bit of the weight are duplicated. For example, the highest bit 411A of the input data (encoded into the unary code) is duplicated fifteen times and a bit "0" is added to form the bits 413A; and the lowest bit 411B of the input data (encoded into the unary code) is duplicated fifteen times and a bit "0" is added to form the bits 413B. By so, the input is represented in the unFDP format.

Similarly, the weight 412 (encoded into the unary code) is duplicated fifteen times and a bit "0" is additionally added into each of the weights 414, By so, the weight is represented in the unFDF format.

The multiplication operation is performed on the input data (represented in the unFDP format) and the weights (represented in the unFDF format) to generate an MAC operation result. In details, the bits 413A of the input data are multiplied by the weight 414; the bits 413B of the input data are multiplied by the weight 414; and so on. The MAC operation result ("5") is generated by adding the multiplication values.

In the prior art, in MAC operations on 8-bit input data and 8-bit weight, if direct MAC operations are used, then the total memory cell number used in the direct MAC operations will be 255*255*512=33,292,822.

On the contrary, in one embodiment of the application, in MAC operations on 8-bit input data and 8-bit weight, the total memory cell number used in the direct MAC operations will be 15*15*512*2=115,200*2=230,400. Thus, the memory cell number used in the MAC operation according to one embodiment of the application is about 0.7% of the memory cell number used in the prior art.

In one embodiment of the application, by using unFDP-based data mapping, the memory cell number used in the MAC operation is reduced and thus the operation cost is also reduced. Further, ECC (error correction code) cost is also reduced and the tolerance of the fail-bit effect is improved.

Referring to FIG. 1 and FIG. 2 again. In one embodiment of the application, in multiplication operations, the weight (the transconductance) is stored in the memory cells 211 of the memory block 210 and the input data (the voltage) is stored read out by the page buffer and transmitted to the common data latch 221D, The common data latch 221D outputs the input data to the input latch 221A.

In order to explain the multiplication operations of one embodiment of the application, now refer to FIG. 5 which shows one example of the multiplication operations of one embodiment of the application. FIG. 5 is used in the case that the memory device supports the selected bit-line read function. In FIG. 5, the input latch 221A includes a latch 505 and a bit line switch 510.

As shown in FIG. 5, the weight is represented into unary code (value format), as shown in FIG. 32. Thus, the highest bit of the weight is stored in eight memory cells 211 the second highest bit of the weight is stored in four memory cells 211, the third highest bit of the weight is stored in two memory cells 211 and the lowest bit of the weight is stored in one memory cell 211.

Similarly, the input data is represented into unary code (value format) (as shown in FIG. 3). Thus, the highest bit of the input data is stored in eight common data latches 221D, the second highest bit of the input data is stored in four common data latches 221D, the third highest bit of the input data is stored in two common data latches 221D and the lowest bit of the input data is stored in one common data latch 121D. The input data is sent from the common data latches 221D to the latches 505.

In FIG. 5, the plurality of bit line switches 510 are coupled between the memory cells 211 and the sensing amplifiers 221B. The bit line switches 510 are controlled by outputs of the latches 505. For example, when the latch 505 outputs bit "1", the bit line switch 510 is conducted while when the latch 505 outputs bit "0", the bit line switch 510 is disconnected.

Further, when the weight stored in the memory cell 211 is bit 1 and the bit line switch 510 is conducted (i.e. the input data is bit 1), the SA 221B senses the memory cell current to generate the multiplication result "1". When the weight stored in the memory cell 211 is bit 0 and the bit line switch 510 is conducted (i.e. the input data is bit 1), the SA 221B senses no memory cell current. When the weight stored in the memory cell 211 is bit 1 and the bit line switch 510 is disconnected (i.e. the input data is bit 0), the SA 221B senses no memory cell current (to generate the multiplication result "0"). When the weight stored in the memory cell 211 is bit 0 and the bit line switch 510 is disconnected (i.e. the input data is bit 0), the SA 221B senses no memory cell current.

That is, via the layout shown in FIG. 5, when the input data is bit 1 and the weight is bit 1, the SA 221B senses the memory cell current (to generate the multiplication result "1"). In other situations, the SA 221B senses no memory cell current (to generate the multiplication result "0"). The multiplication result of the SA 221B is sent to the output latch 221C. The outputs (which form the bit multiplication result BM) of the output latches 221C is stored back to the page buffer PB via the common data latch 221D.

The memory cell currents IMC from the memory cells 211 are summed and input into one among the conversion units ADC0-ADC3.

The relationship between the input data, the weight, the digital multiplication result and the analog memory cell current IMC is as the following table:

| the input data | the weight | the digital multiplication result | IMC |
|---|---|---|---|
| 0 | 0 (HVT) | 0 | 0 |
| 0 | +1 (LVT) | 0 | 0 |
| 1 | 0 (HVT) | 0 | IHVT |
| 1 | +1 (LVT) | 1 | ILVT |

In the above table, HVT and LVT refer to high-threshold memory cell and low-threshold memory cell, respectively; and IHVT and ILVT refer to the respective analog memory cell current IMC generated by the high-threshold memory cell (the weight is 0(HTV) and the low-threshold memory cell (the weight is +1(LTV) when the input data is logic 1.

In one embodiment of the application, in multiplication operations, the selected bit line read (SBL-read) command may be reused to reduce the variation influence due to single-bit representation.

Figure 6A:
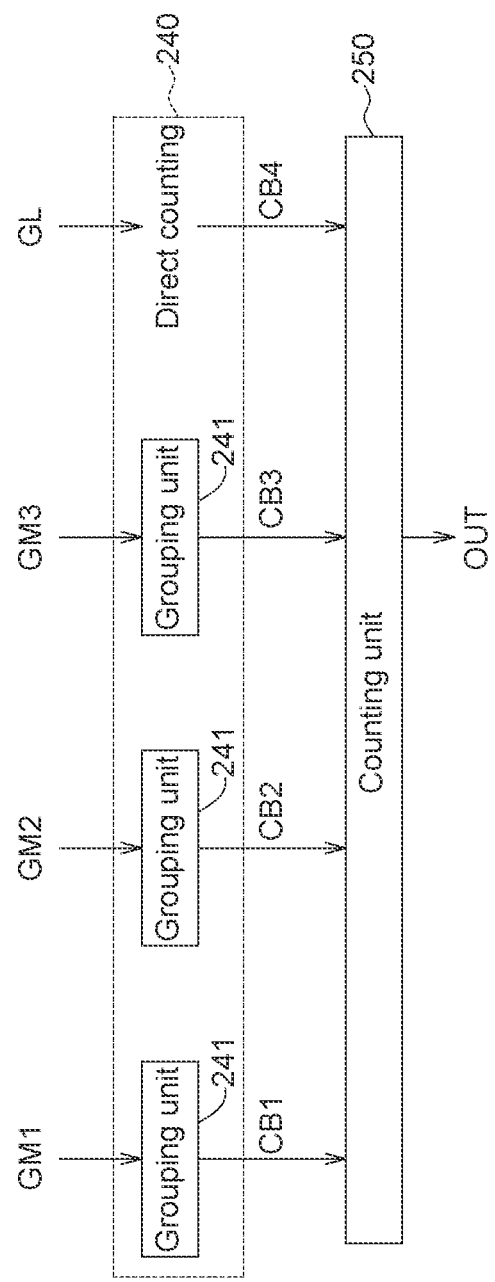
FIG. 6A and FIG. 6B show the grouping operation (the majority operation) and counting according to the first embodiment of the application.

Now refer to FIG. 6A, which shows the grouping operation (the majority operation) and bitwise counting according to one embodiment of the application. As shown in FIG. 6A, "GM1" refers to a first multiplication result from bitwise multiplication on the first MSB vector of the input data by the weights; "GM2" refers to a second multiplication result from bitwise multiplication on the second MSB vector of the input data by the weights; "GM3" refers to a third multiplication result from bitwise multiplication on the third MSB vector of the input data by the weights; and "GL" refers to a fourth multiplication result from bitwise multiplication on the LSB vector of the input data by the weights. After the grouping operation (the majority operation), the grouping result performed on the first multiplication result "GM1" is a first grouping result CB1 (whose accumulation weight is $2^2$); the grouping result performed on the second multiplication result "GM2" is a second grouping result CB2 (whose accumulation weight is $2^2$); the grouping result performed on the third multiplication result "GM3" is a third grouping result CB3 (whose accumulation weight is $2^2$); and the direct counting result on the fourth multiplication result "GL" is a fourth grouping result CB4 (whose accumulation weight is $2^0$).

Figure 6B:
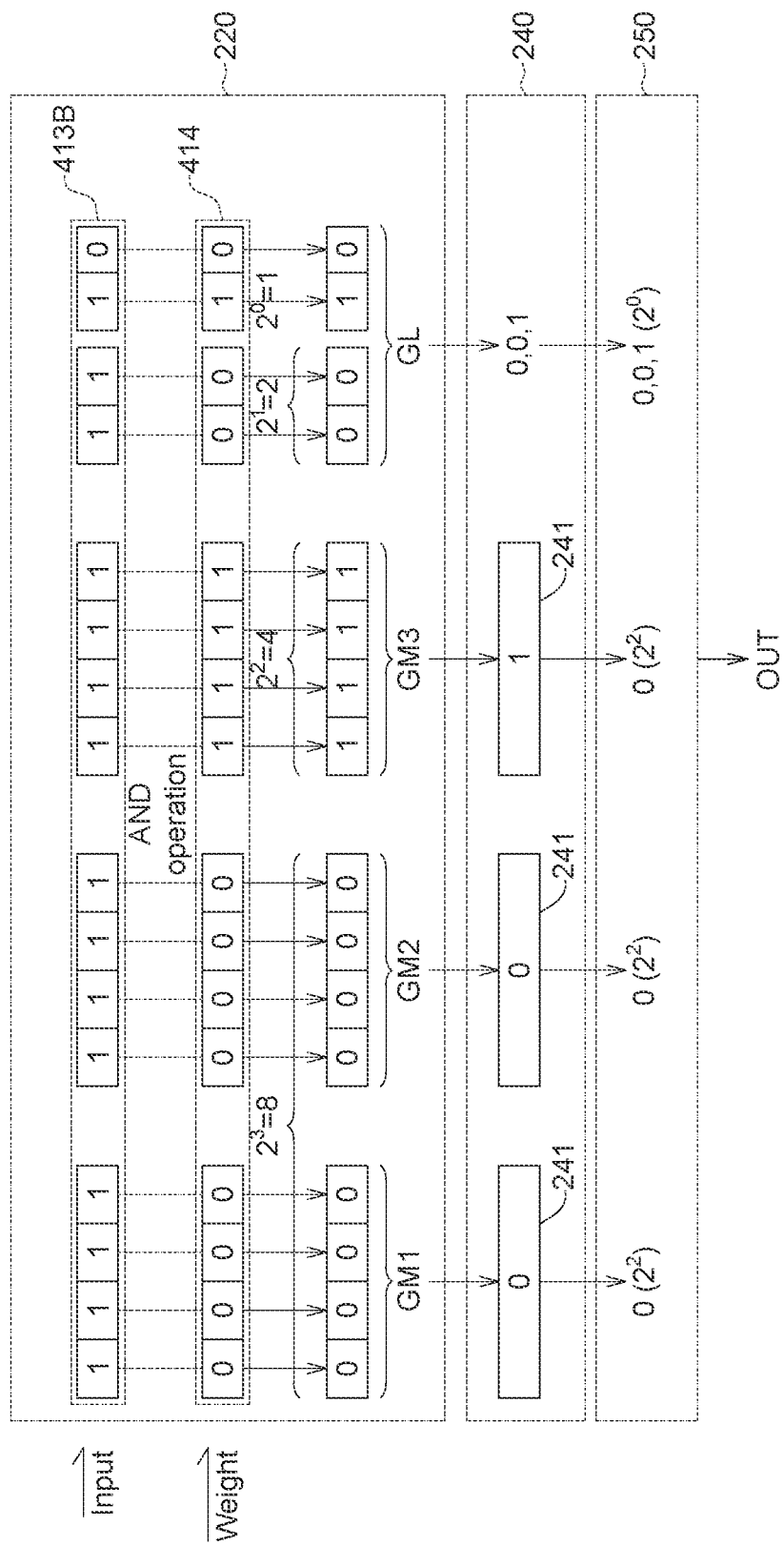

FIG. 6B shows one accumulation example in FIG. 4C. Refer to FIG. 4C and FIG. 6B. As shown in FIG. 6B, the bits 413B of the input data (in FIG. 4C) are multiplied by the weight 414. The first four bits ("0000") of the multiplication result, generated by multiplication of the bits 413B of the input data (in FIG. 4C) with the weight 414, are grouped as the first multiplication result "GM1". Similarly, the fifth to the eighth bits ("0000") of the multiplication result, generated by multiplication of the bits 413B of the input data (in FIG. 4C) with the weight 414, are grouped as the second multiplication result "GM2". The ninth to the twelfth bits ("1111") of the multiplication result, generated by multiplication of the bits 413B of the input data (in FIG. 4C) with the weight 414, are grouped as the third multiplication result "GM3". The thirteenth to the sixteenth bits ("0010") of the multiplication result, generated by multiplication of the bits 413B of the input data (in FIG. 4O) with the weight 414, are directly counted.

After the grouping operation (the majority operation), the first grouping result CB1 is "0" (whose accumulation weight is $2^2$); the second grouping result CB2 is "0" (whose accumulation weight is $2^2$); the third grouping result CB3 is "1" (whose accumulation weight is $2^2$). In counting, the MAC result is generated by accumulating the respective grouping results CB1-CB4 multiplied by the respective accumulation weight. For example, as shown in FIG. 6B, the MAC operation result OUT is:

$$CB1*2^2+CB2*2^2+CB3*2^2CB4*2^0=0*2^20*+2^2+1*2^2+1*2^0=0000\ 0000\ 0000\ 0000\ 0000\ 0000\ 0000\ 0101=5.$$

In one embodiment of the application, the grouping principle (for example, the majority principle) is as follows.

| Group bits | Grouping result (Majority result) |
|---|---|
| 1111 (case A) | 1 |
| 1110 (case B) | 1 |
| 1100 (case C) | 1 or 0 |
| 1000 (case D) | 0 |
| 0000 (case E) | 0 |

In the above table, in case A, because the group has correct bits ("1111" which means no error bits), the majority result is 1. Similarly, in the above table, in case E, because the group has correct bits ("0000" which means no error bits), the majority result is 0.

In case B, because the group has one error bit (among "1110", the bit "0" is error), by majority function, the group "1110" is determined to be "1". In case D, because the group has one error bit (among "0001", the bit "1" is error), by majority function, the group "0001" is determined to be "0".

In case C, because the group has two error bits (among "1100", the bits "00" or "11" are error), by majority function, the group "1100" is determined to be "1" or "0".

Thus, in one embodiment of the application, by grouping (majority) function, the error bits are reduced.

The majority results from the grouping circuit 240 are input into the counting unit 250 for bitwise counting.

In counting, the counting result for the mutt cation results of the MSB vector and the counting result for the multiplication results of the LSB vector are add or accumulated. As shown in FIG. 6A, two accumulators are used. A first accumulator is assigned by a heavy accumulating weight (for example $2^2$). The first accumulator is accumulating: (1) the grouping result (the majority result) (having one bit) from performing the grouping operation (the majority operation) on the multiplication result GM1, (2) the grouping result (the majority result) (having one bit) from performing the grouping operation (the majority operation) on the multiplication result GM2, and (3) the grouping result (the majority result) (having one bit) from performing the grouping operation (the majority operation) on the multiplication result GM3, The accumulation result by the first accumulator is assigned by heavy accumulating weight (for example $2^2$). A second accumulator is assigned by a light accumulating weight (for example $2^0$). The second accumulator is directly accumulating the multiplication result GL (having multiple bits). The two accumulation results by the two accumulators are added to output the MAC operation result OUT. For example but not limited by, (1) the grouping result (the majority result) (having one bit) from performing the grouping (majority) operation on the multiplication result GM1 is "1" (one bit), (2) the grouping result (the majority result) (having one bit) from performing the grouping (majority) operation on the multiplication result GM2 is "0" (one bit), and (3) the grouping result (the majority result) (having one bit) from performing the grouping (majority) operation on the multiplication result GM3 is "1" (one bit). The accumulation result by the first accumulator, after weighting, is $2(=1+0+1)*2^2=8$. The multiplication result GL is 4 (having three bits). The MAC operation result OUT is $8+4=12$.

From the above, in one embodiment of the application, in counting or accumulation, the input data is in the unFDP format, data stored in the CDL is grouped into the MSB vector and the LSB vector. By group (majority) function, the error bits in the MSB vector and the LSB vector are reduced.

Further, in one embodiment of the application, even the conventional accumulator (the conventional counter) is used, the time cost in counting and accumulating is also reduced. This is because digital counting command (error bit counting) is applied in one embodiment of the application and different vectors (the MSB vector and the LSB vector) are assigned by different accumulating weights. In one possible example, the time cost in accumulation operation is reduced to about 40%.

Figure 7A:
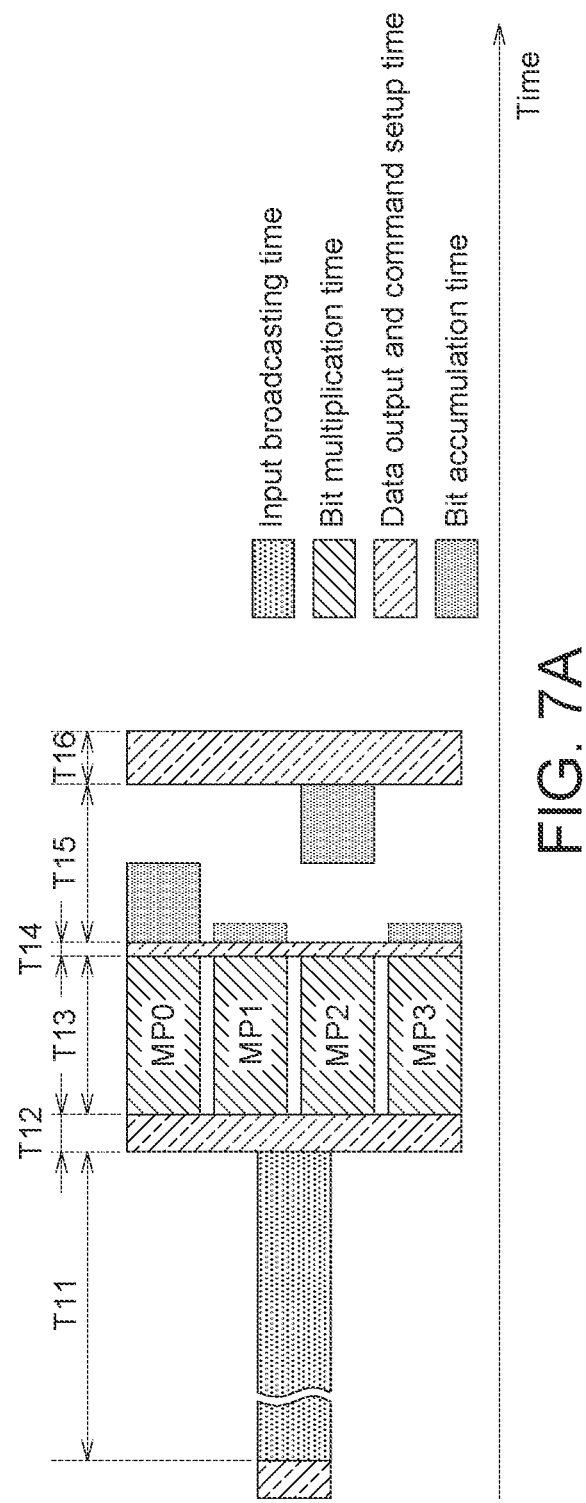
FIG. 7A and FIG. 7B show MAC operation flows according to the first embodiment of the application.
Figure 7B:
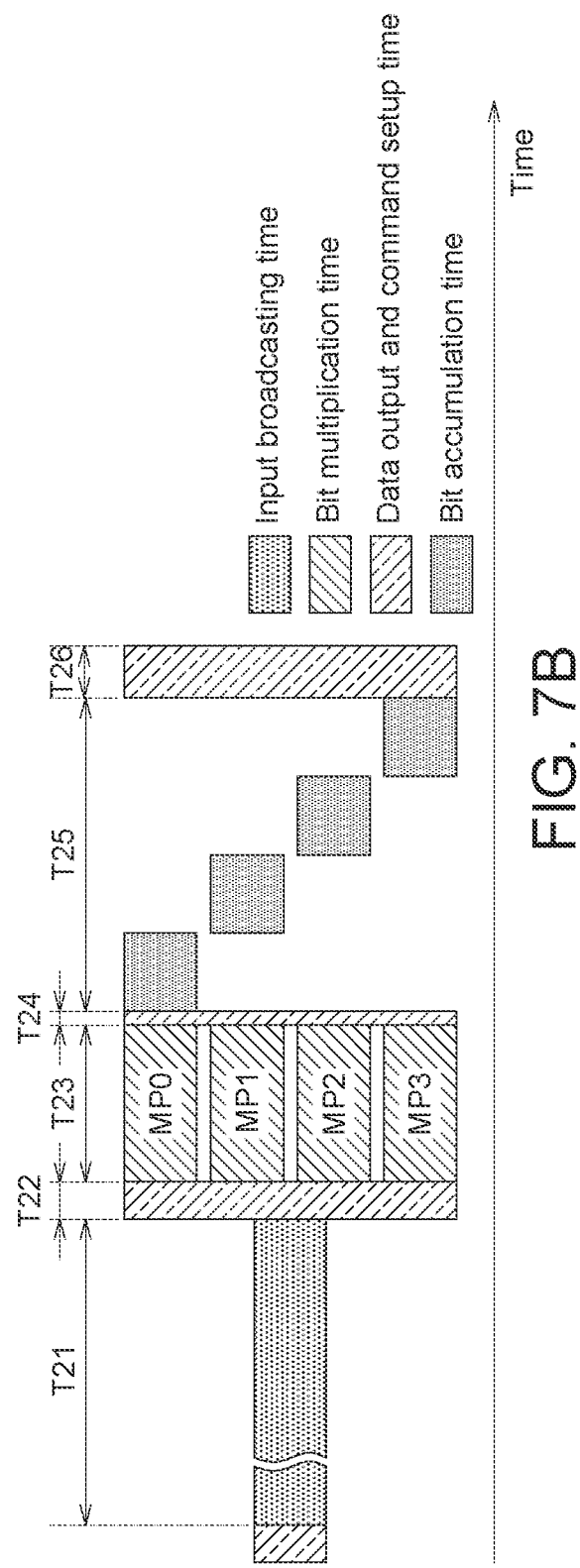

FIG. 7A and FIG. 7B show MAC operation flows in one embodiment of the application. FIG. 7A shows the MAC operation flow when the conversion units ADC0-ADC3 are triggered and the MAC operation flow may be also referred as a hybrid MAC operation flow, FIG. 7B shows the MAC operation flow when the conversion units ADC0-ADC3 are not triggered and the MAC operation flow may be also referred as a digital MAC operation flow. When the conversion units ADC0-ADC3 are not triggered, the output latch 130 outputs the bit multiplication results BM0-BM3 to the accumulation circuit 140 for bit accumulation (that is, the output latch 130 is not controlled by the page buffer selection signal PB_SEL and the accumulation circuit 140 is not controlled by the accumulation enable signal ACC_EN).

In FIG. 7A, during the timing period T11, the input is broadcasted (i.e. the input data is received). During the timing period T12, a plurality of addresses of the memory planes are received. The memory planes perform operations based on different addresses. However, one embodiment of the application prevents the situation that several memory planes use the same address; and thus, the memory planes use different addresses. During the timing period T13, based on the received addresses of the memory planes, bit multiplication is performed. During the timing period T14, the bit multiplication results are output (for example, output from the memory planes to the accumulation circuits). During the timing period T15, bit accumulation is performed. Bit accumulation on different memory planes are executed in sequential. For example, as shown in FIG. 7A, the conversion results AMACO0 and AMACO2 are higher than the threshold value, bit accumulation on the memory planes MP0 and MP2 are executed in sequential while bit accumulation on the memory planes MP1 and MP3 are not executed. Of course, the sequence of the bit accumulation is not limited by FIG. 7A. In FIG. 7A, bit accumulation on the memory plane MP2 is executed first and then bit accumulation on the memory plane MP is executed later, which is also within the spirit and scope of the application. During the timing period T16, the MAC operation results are output; and the next addresses of the memory planes are also output.

In FIG. 7B, the timing periods T21-T24 and T26 are the same or similar to the timing periods T11-T14 and T16. During the timing period T25 (bit accumulation), because the conversion units ADC0-ADC3 are not triggered, in bit accumulation, bit accumulation on all memory planes are executed in sequential. For example, as shown in FIG. 7B, bit accumulation on the memory planes MP0, MP1, MP2 and MP3 are executed in sequential. Of course, the sequence of the bit accumulation is not limited by FIG. 7B, other execution sequence of the bit accumulation is also possible, which is also within the spirit and scope of the application.

As shown in FIG. 7A and FIG. 7B, in the first embodiment of the application, the bit multiplication operations on different memory planes are performed in parallel while the bit accumulation operations on different memory planes are performed in sequential. Thus, in the first embodiment of the application, the scheduling is in centralized control which reduces circuit area and power consumption.

From FIG. 7A and FIG. 7B, the MAC operation in the embodiment of the application has two types of sub-operations. The first sub-operation is multiplication to multiply the input data with the weights, which is based on the selected bit line read command. The second sub-operation is accumulation (data counting), especially, fail bit counting. In other possible embodiment of the application, more counting unit may be used to speed up the counting or accumulation operations.

Second Embodiment

Figure 8:
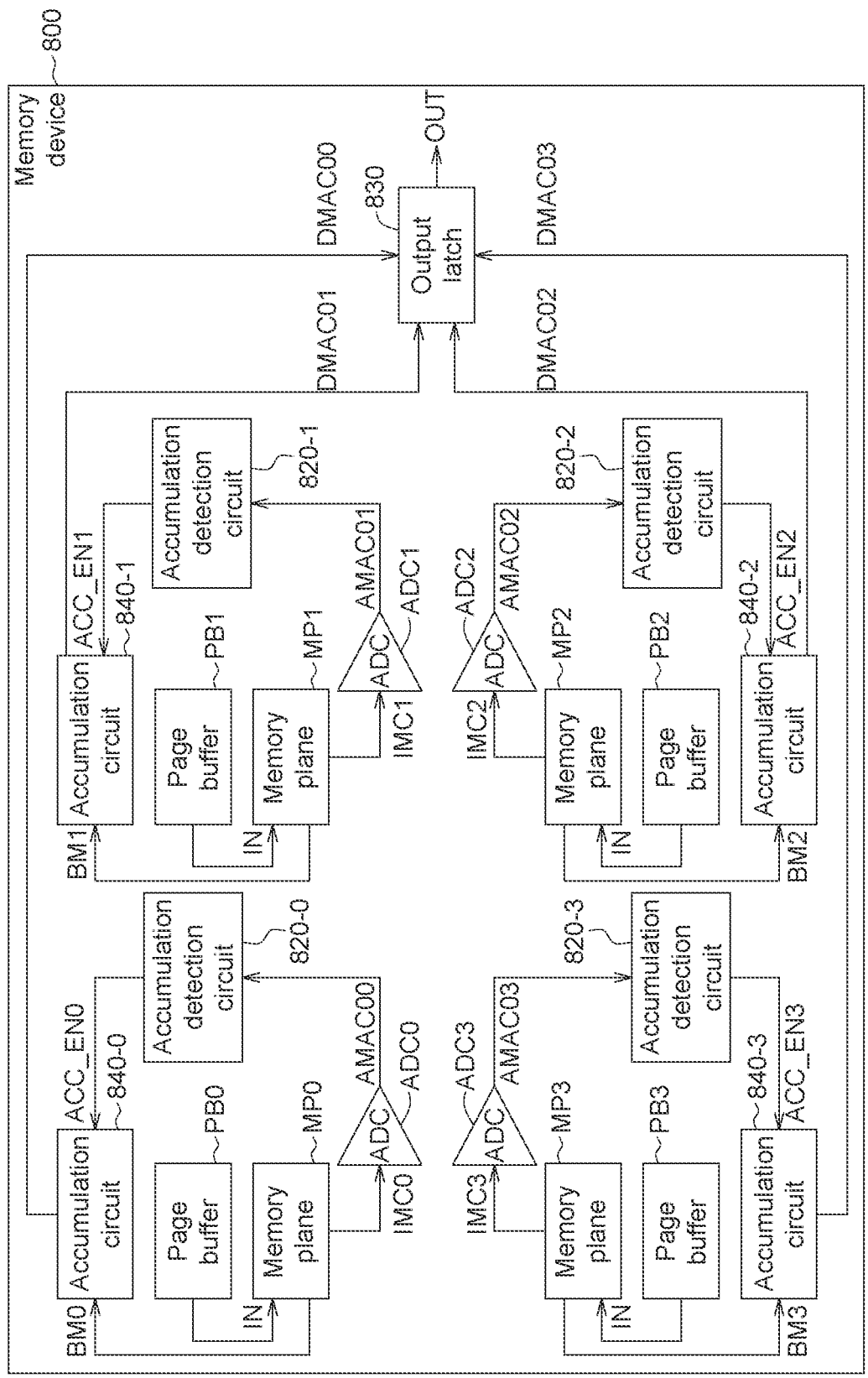
FIG. 8 shows a functional block diagram of an IMC (In-Memory-Computing) memory device according to a second embodiment of the application.

FIG. 8 shows a functional block diagram of an IMC (In-Memory-Computing) memory device 800 according to a second embodiment of the application. The memory device 800 includes a plurality of memory planes, a plurality of page buffers, a plurality of conversion units, a plurality of accumulation detection circuits, an output latch 830 and a plurality of accumulation circuits. The conversion unit is for example but not limited by, an analog-to-digital converter (ADC).

For simplicity, in FIG. 8, the memory device 800 includes four memory planes MP0-MP3, four page buffers PB0-PB3, four conversion units ADC0-ADC3, four accumulation detection circuits 820-0~820-3, an output latch 830 and four accumulation circuits 840-0~840-3. But the application is not limited thereby.

The page buffers PB0-PB3 may store an input data IN and send the input data IN to the memory planes MP0-MP3, A plurality of bit multiplication results BM0-BM3 generated by the memory planes MP0-MP3 are stored back to the page buffers PB0-PB3 and for sending to the accumulation circuits 840-0-840-3.

The memory planes MP0-MP3 are coupled to the page buffers PB0-PB3. The memory planes MP0-MP3 parallel perform bit multiplication operations (for example, bit AND operations) on weights stored in the memory planes MP0-MP3 with the input data IN from the page buffers PB0-PB3 to parallel generate the bit multiplication results BM0-BM3. The bit multiplication results BM0-BM3 are stored back into the page buffers PB0-PB3. Further, one or more memory cell string(s) of the memory planes MP0-MP3 are selected to enable the sensing operations. When the weights stored in the memory planes MP0-MP3 and the input data IN from the page buffers PB0-PB3 are bit-multiplied, a plurality of memory cells of the memory planes MP0-MP3 generate a plurality of memory cell currents IMC0-IMC3 and the memory cell currents IMC0-IMC3 are commonly input into the conversion units ADC0-ADC3.

The conversion units ADC0-ADC3 are coupled to the memory planes MP0-MP3. The memory cell currents IMC0-IMC3 of the memory planes MP0-MP3 are input into the conversion units ADC0-ADC3, respectively. The conversion units ADC0-ADC3 convert the memory cell currents IMC0-IMC3 of the memory planes MP0-MP3 into a plurality of conversion results AMACO0-AMACO3.

The accumulation detection circuits 820-0-820-3 are coupled to the conversion units ADC0-ADC3. The accumulation detection circuits 820-0-820-3 compare the conversion results AMACO0-AMACO3 of the conversion units ADC0-ADC3 with a threshold value to generate a plurality of accumulation enable signals ACC_EN0-ACC_EN3 to the accumulation circuits 840-0-840-3. When the conversion results AMACO0-AMACO3 are higher than the threshold value, the corresponding accumulation enable signals ACC_EN0-ACC_EN3 are in the enabled state; and on the contrary, the accumulation enable signals ACC_EN0-ACC_EN3 are in the disabled state.

The accumulation circuits 840-0-840-3 are coupled to the accumulation detection circuits 820-0-820-3. When enabled by the accumulation enable signals ACC_EN0-ACC_EN3, the accumulation circuits 840-0-840-3 perform bit accumulation operations on the bit multiplication results BM0-BM3 from the memory planes MP0-MP3 to generate a plurality of digital accumulation results DMACO0-DMACO3.

The output latch 830 is coupled to the accumulation circuits 840-0-840-3. The output latch 830 outputs the digital accumulation results DMACO0-DMACO3 from the accumulation circuits 840-0-840-3 into the MAC operation result OUT.

The accumulation circuits 840-0-840-3 may have the same or similar circuit structure and operations as the accumulation circuit 140 in FIG. 2 and thus the details are omitted. Similarly, the memory plane MP in FIG. 2 may be used to implement the memory planes MP0-MP3 of FIG. 8.

In the second embodiment of the application, the cell currents of each memory plane are individually quantized.

Data mapping in the second embodiment may be the same or similar to data mapping in the first embodiment and thus the details are omitted.

Figure 9A:
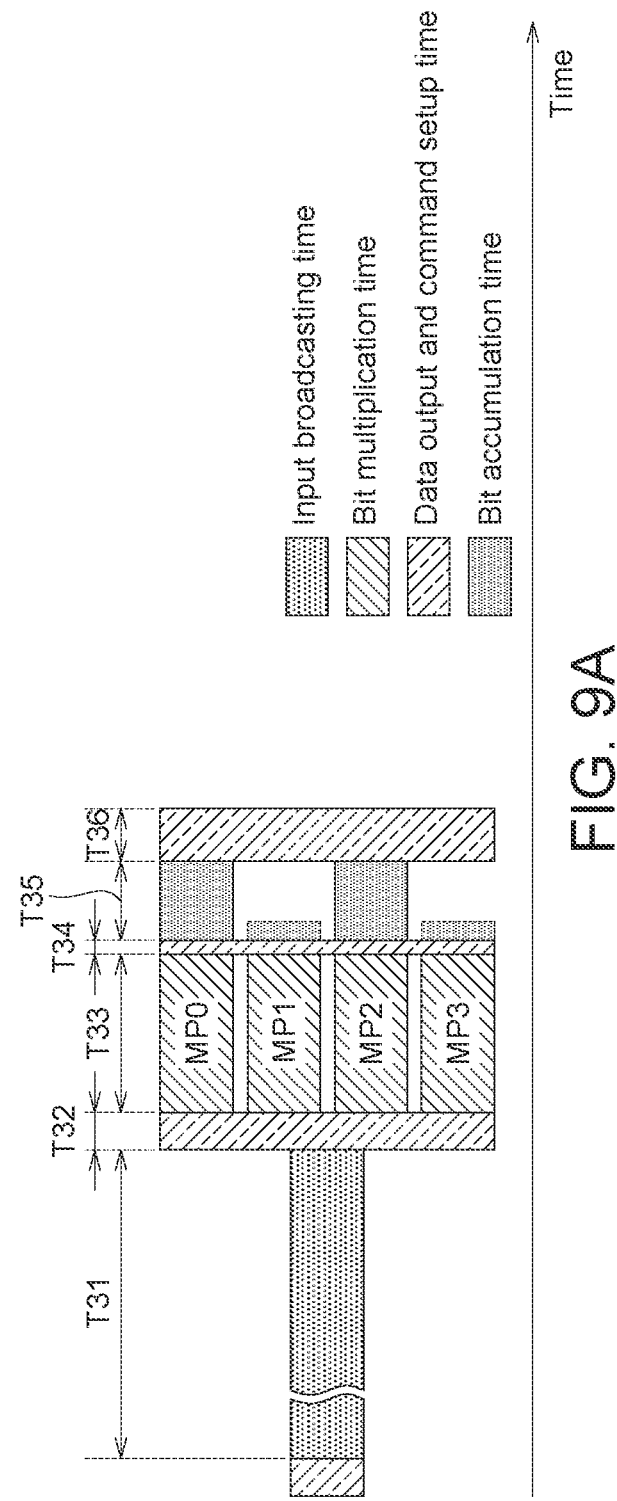
FIG. 9A and FIG. 9B show MAC operation flows according to the second embodiment of the application.
Figure 9B:
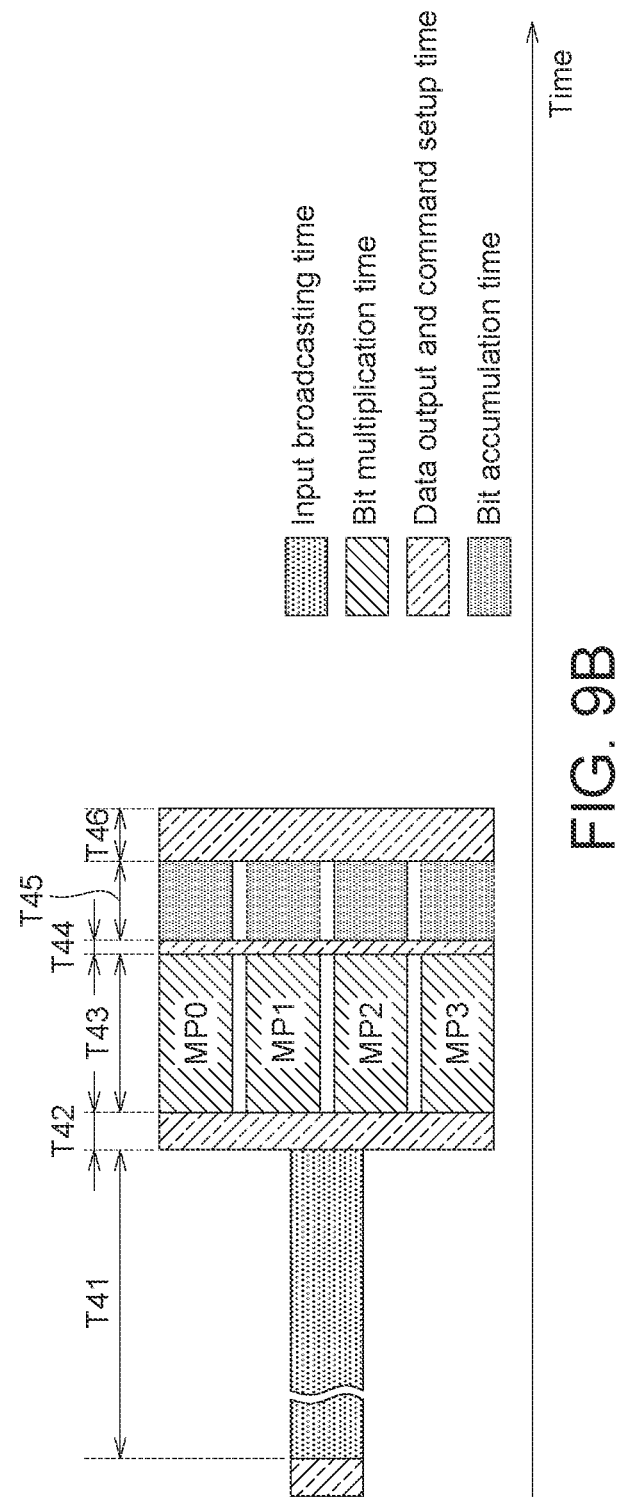

FIG. 9A and FIG. 9B show MAC operation flows in the second embodiment of the application. FIG. 9A shows the MAC operation flow when the conversion units ADC0-ADC3 are triggered and the MAC operation flow may be also referred as the hybrid MAC operation flow. FIG. 9B shows the MAC operation flow when the conversion units ADC0-ADC3 are not triggered and the MAC operation flow may be also referred as the digital MAC operation flow. When the conversion units ADC0-ADC3 are not triggered, the accumulation circuits 840-0-840-3 perform bit accumulation on the bit multiplication results BM0-BM3 (that is, the accumulation circuits 840-0-840-3 are not controlled by the accumulation enable signals ACC_EN0-ACC_EN3).

In FIG. 9A, the timing periods T31-T34 and T36 are the same or similar to the timing periods T11-T14 and T16. During the timing period T35, the bit accumulation is performed. In bit accumulation, bit accumulation on different memory planes are executed in parallel. For example, as shown in FIG. 9A, the conversion results AMACO0 and AMACO2 are higher than the threshold value, bit accumulation on the memory planes MP0 and MP2 are executed in parallel while bit accumulation on the memory planes MP1 and MP3 are not executed.

In FIG. 9B, the timing periods T41-T44 and T46 are the same or similar to the timing periods T11-T14 and T16. During the timing period T45, because the conversion units ADC0-ADC3 are not triggered, in bit accumulation, bit accumulation on all memory planes are executed in parallel.

As shown in FIG. 9A and FIG. 9B, in the second embodiment of the application, the bit multiplication operations on different memory planes are performed in parallel while the bit accumulation operations on different memory planes are performed in parallel. Thus, in the second embodiment of the application, the scheduling is in distributed control which fastens MAC operations.

FIG. 3, FIG. 4A to FIG. 4C, FIG. 5 and FIG. 6A to FIG. 6B are also applicable to the second embodiment of the application.

Third Embodiment

Figure 10:
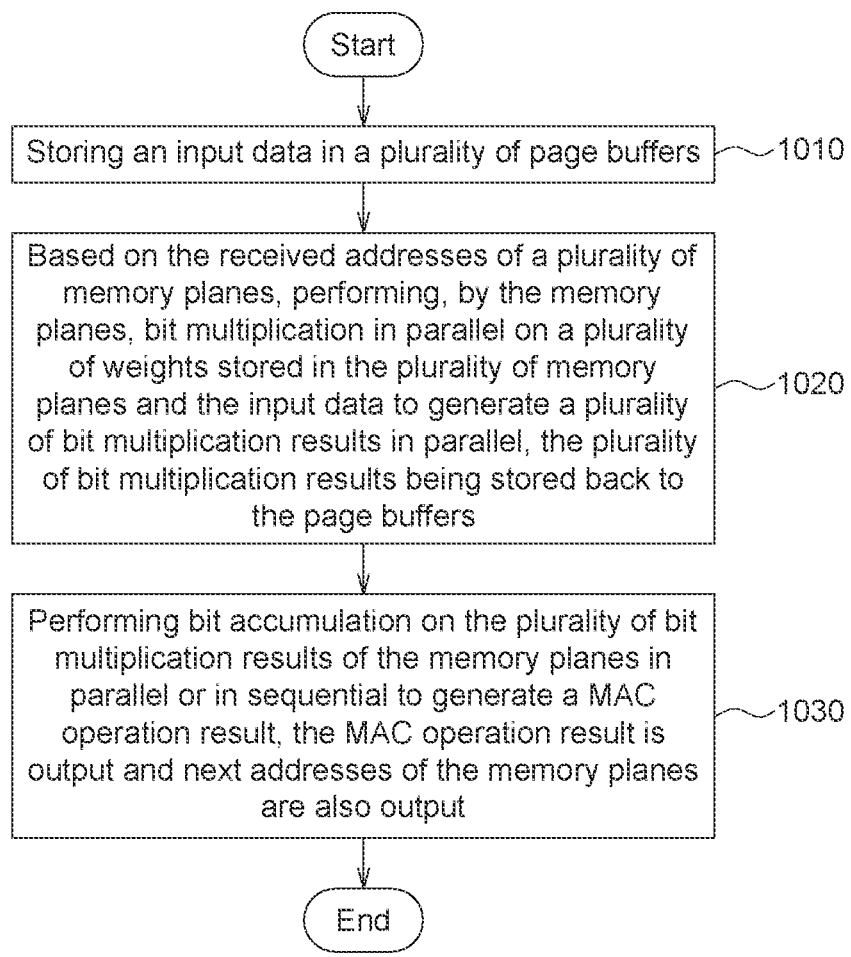
FIG. 10 shows a flow chart of an operation method for a memory device according to a third embodiment of the application.

FIG. 10 shows an operation method for a memory device according to a third embodiment of the application. The operation method for the memory device according to the third embodiment of the application includes: storing an input data in a plurality of page buffers (1010); based on the received addresses of a plurality of memory planes, performing, by the memory planes, bit multiplication in parallel on a plurality of weights stored in the plurality of memory planes and the input data to generate a plurality of bit multiplication results in parallel, the plurality of bit multiplication results being stored back to the page buffers (1020); and performing bit accumulation on the plurality of bit multiplication results of the memory planes in parallel or in sequential to generate a multiply-accumulate (MAC) operation result, the MAC operation result is output and next addresses of the memory planes are also output (1030). Details of the steps 1010-1030 are as described above and thus are omitted.

The read voltage may affect the output value from the ADC and reading of bit 1. In the first to the third embodiments of the application, based on the operation conditions (for example but not limited by, the programming cycle, the temperature or the read disturbance), the read voltage may be periodically calibrated to keep high accuracy and high reliability.

The first to the third embodiments of the application are applied to NAND type flash memory, or the memory device sensitive to the retention and thermal variation, for example but not limited by, NOR type flash memory, phase changing memory, magnetic RAM or resistive RAM.

The first to the third embodiments of the application is applied in 3D structure memory device and 2D structure memory device, for example but not limited by, 2D/3D NAND type flash memory, 2D/3D NOR type flash memory, 2D/3D phase changing memory, 2D/3D magnetic RAM or 2D/3D resistive RAM.

Although in the first to the third embodiments of the application, the input data and/or the weight are divided into the MSB vector and the LSB vector (i.e. two vectors), but the application is not limited by this. In other possible embodiment of the application, the input data and/or the weight are divided into more vectors, which is still within the spirit and the scope of the application.

The first to the third embodiments of the application are not only applied to majority group technique, but also other grouping techniques to speed up accumulation.

The first to the third embodiments of the application are A techniques, for example but not limited by, face identification.

In the first to the third embodiments of the application, the conversion unit may be implemented by a current mode ADC, a voltage mode ADC or a hybrid mode ADC.

The first to the third embodiments of the application may be applied in serial MAC operations or parallel MAC operations.

The first to the third embodiments of the application may be applied to non-volatile memory or volatile memory.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A memory device including;
a plurality of page buffers, storing an input data;
a plurality of memory planes coupled to the page buffers,
 a plurality of weights stored in the memory planes, based on received addresses of the memory planes, the memory planes performing bit multiplication on the weights and the input data in the page buffers in parallel to generate a plurality of bit multiplication results in parallel, the bit multiplication results stored back to the page buffers; and
at least one accumulation circuit coupled to the page buffers, for performing bit accumulation on the bit multiplication results of the memory planes in parallel or in sequential to generate a multiply-accumulate (MAC) operation result.

2. The memory device according to claim 1, further including:
a plurality of conversion units coupled to the memory planes, for converting a plurality of memory cell currents from the memory planes into a plurality of conversion results;
an accumulation detection circuit coupled to the conversion units, for comparing the conversion results of the conversion units with a threshold value, respectively to generate a page buffer selection signal and to generate an accumulation enable signal; and
an output latch, coupled to the accumulation detection circuit, in response to the page buffer selection signal, the output latch selecting corresponding bit multiplication results stored in corresponding page buffers to the at least one accumulation circuit,
in response to the accumulation enable signal, the at least one accumulation circuit sequentially performing bit accumulation operations on the bit multiplication results selected by the output latch to generate the MAC operation result.

3. The memory device according to claim 2, wherein
when the conversion units are triggered, the memory device performs a hybrid MAC operation; and
when the conversion units are not triggered, the memory device performs a digital MAC operation.

4. The memory device according to claim 2, wherein
when the conversion units are triggered, the at least one accumulation circuit sequentially performs bit accumulation on at least one target conversion result among the conversion results, the at least one target conversion result being higher than the threshold value; and
when the conversion units are not triggered, the at least one accumulation circuit sequentially performs bit accumulation on all the conversion results, no matter the conversion results are higher than the threshold value or not.

5. The memory device according to claim 1, further including:
a plurality of conversion units coupled to the memory plane, for converting a plurality of memory cell currents from the memory planes into a plurality of conversion results;
a plurality of accumulation detection circuits coupled to the conversion units, for comparing the conversion results of the conversion units with a threshold value, respectively to generate a plurality of accumulation enable signals; and
an output latch,
wherein the at least one accumulation circuit includes a plurality of accumulation circuits, coupled to the accumulation detection circuits, when enabled by the accumulation enable signals, the accumulation circuits performing bit accumulation operations in parallel on the bit multiplication results from the memory planes to generate a plurality of digital accumulation results; and
the output latch coupled to the accumulation circuits for outputting the digital accumulation results from the accumulation circuits into the MAC operation result.

6. The memory device according to claim 5, wherein
when the conversion units are triggered, the memory device performs a hybrid MAC operation; and
when the conversion units are not triggered, the memory device performs a digital MAC operation.

7. The memory device according to claim 5, wherein
when the conversion units are triggered, the accumulation circuits perform bit accumulation in parallel on at least one target conversion result among the conversion results, the at least one target conversion result being higher than the threshold value; and
when the conversion units are not triggered, the accumulation circuits perform bit accumulation in parallel on all the conversion results, no matter the conversion results are higher than the threshold value or not.

8. The memory device according to claim 1, wherein the at least one accumulation circuit includes
a grouping circuit, for performing grouping operations on the bit multiplication results from the memory planes to generate a plurality of grouping results; and
a counting unit, coupled to the grouping circuit for performing bitwise counting on the grouping results to generate the MAC operation result.

9. The memory device according to claim 1, wherein
a plurality of bits of each of the input data or each of the weights are divided into a plurality of bit vectors;
each bit of the bit vectors is transformed from a binary format into a unary code;
said each bit of the bit vectors represented in the unary code is duplicated a plurality of times into an unFDP (unfolding dot product) format; and
the multiplication circuit performs multiplication operations on the input data and the weights represented in the unFDP format to generate the bit multiplication results.

10. An operation method for a memory device, the operation method including:
storing an input data in a plurality of page buffers;
based on received addresses of a plurality of memory planes, performing, by the memory planes, bit multiplication in parallel on a plurality of weights stored in the plurality of memory planes and the input data to generate a plurality of bit multiplication results in parallel, the plurality of bit multiplication results being stored back to the page buffers; and
performing bit accumulation on the plurality of bit multiplication results of the memory planes in parallel or in sequential to generate a multiply-accumulate (MAC) operation result.

11. The operation method for memory device according to claim 10, further including:
converting a plurality of memory cell currents from the memory planes into a plurality of conversion results;
comparing the conversion results with a threshold value, respectively to generate a page buffer selection signal and to generate an accumulation enable signal; and
in response to the page buffer selection signal and the accumulation enable signal, selecting corresponding bit multiplication results stored in corresponding page buffers to sequentially perform bit accumulation operations to generate the MAC operation result.

12. The operation method for memory device according to claim 11, wherein
the memory device performs a hybrid MAC operation or a digital MAC operation.

13. The operation method for memory device according to claim 11, wherein
sequentially performing bit accumulation on at least one target conversion result among the conversion results, the at least one target conversion result being higher than the threshold value; or
sequentially performing bit accumulation on all the conversion results, no matter the conversion results are higher than the threshold value or not.

14. The operation method for memory device according to claim 10, further including:
converting a plurality of memory cell currents from the memory planes into a plurality of conversion results;
comparing the conversion results with a threshold value, respectively to generate a plurality of accumulation enable signals; and
in response to the accumulation enable signals, performing bit accumulation operations in parallel on the bit multiplication results from the memory planes to generate a plurality of digital accumulation results; and
outputting the digital accumulation results into the MAC operation result.

15. The operation method for memory device according to claim 14, wherein
the memory device performs a hybrid MAC operation or a digital MAC operation.

16. The operation method for memory device according to claim 14, wherein
performing bit accumulation in parallel on at least one target conversion result among the conversion results, the at least one target conversion result being higher than the threshold value; and performing bit accumulation in parallel on all the conversion results, no matter the conversion results are higher than the threshold value or not.

17. The operation method for memory device according to claim 10, wherein
    performing grouping operations on the bit multiplication results from the memory planes to generate a plurality of grouping results; and
    performing bitwise counting on the grouping results to generate the MAC operation result.

18. The operation method for memory device according to claim 10, wherein
    a plurality of bits of each of the input data or each of the weights are divided into a plurality of bit vectors;
    each bit of the bit vectors is transformed from a binary format into a unary code;
    said each bit of the bit vectors represented in the unary code is duplicated a plurality of times into an unFDP (unfolding dot product) format; and
    a multiplication circuit performs multiplication operations on the input data and the weights represented in the unFDP format to generate the bit multiplication results.

* * * * *